Figure 1:
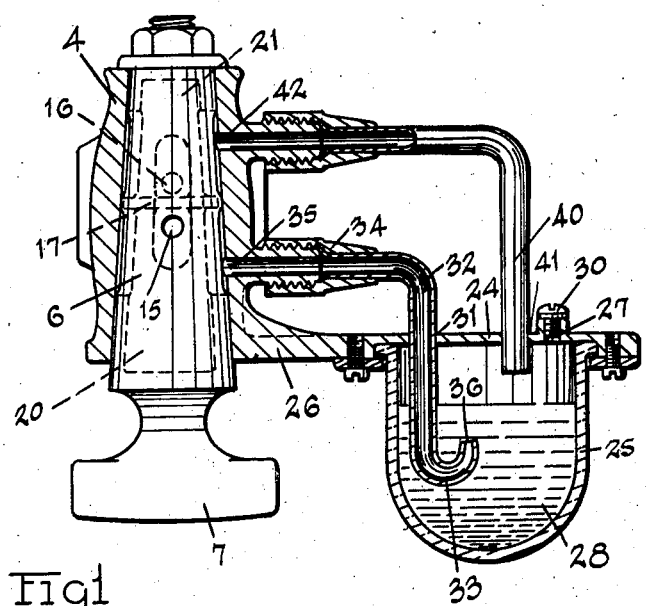

May 22, 1934.     F. G. GRISS     1,959,863
LEAK DETECTOR FOR GAS TRANSMISSION LINES
Filed Dec. 4, 1931

Inventor
Frederick G. Griss
By
Attorney

Patented May 22, 1934

1,959,863

UNITED STATES PATENT OFFICE 1,959,863

LEAK DETECTOR FOR GAS TRANSMISSION LINES

Frederick G. Griss, Perrysburg, Ohio

Application December 4, 1931, Serial No. 578,887

3 Claims. (Cl. 137—77)

This invention relates to devices for testing and detecting the escape or withdrawal of a gas under pressure from within a system. The invention particularly relates to devices which may form a part of the transmission system and direct the expansible force exerted by the gas upon an indicating medium to effect certain visible reactions or indications on the medium when the gas is escaping through leakage.

The invention has for its object to provide a leak detector and means for exposing an indicating medium to the pressure exerted by the gas to move or visibly affect the indicating medium in a testing chamber. The particular object of the invention is to provide a means for transmitting the pressure of the gas from the source of supply and that of the gas in the system into a sealed container and the provision of an element in the container which will visibly indicate the existence and extent of an unbalanced condition of the gas pressures from the inlet and the system, if there be one present. Another object of the invention is to provide a device which may be permanently connected in domestic or local gas lines for transmission of fuel or lighting gas and which may be operated to determine whether the cubic footage recorded by the gas meter in the line is actually being utilized in the system and thereby serves as a checking device on the authenticity of the gas meter reading. A further object of the invention is to provide a leak detector which will not only indicate the presence of leakage of the system, but will also impart to the gas an odoriferous quality of such distinctness as to enable the location and whereabouts of the leak. A still further object of the invention is to provide a leak detector of simple construction which may be manufactured and permanently installed, such as in fuel gas lines, at a low cost and which may be readily operated and will indicate to one unskilled in the art the presence of a leak in the system, thereby providing a device which will readily tend to eliminate the inherent dangers arising by the escape of a more or less injurious gas.

The invention consists in other features and advantages which will appear from the following description and upon examination of the drawings. Structures containing the invention may partake of different forms and may be varied in their details of construction and still embody the invention. To illustrate a practical application of the invention I have selected a leak detector embodying the invention as an example of the various structures and details thereof that contain the invention and shall describe the selected structure hereinafter, it being understood that variations may be made without departing from the spirit of the invention. The particular structure selected is shown in the accompanying drawing.

Figure 2:
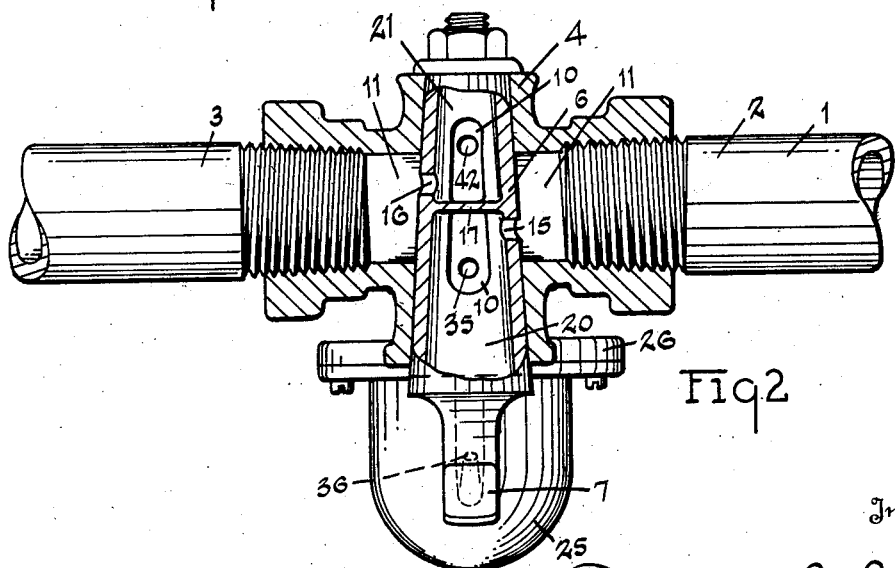

Fig. 1 of the accompanying drawing illustrates a view of a longitudinal section of the leak detector. Fig. 2 illustrates a cross sectional view of the leak detector.

A leak detector embodying my invention is preferably permanently located in the main line of the system and has a suitable four-way valve. The valve has ports connecting with the source of supply and the system and which connect with suitable pipes to direct the gas from the system to within a sealed testing container having transparent walls. A transparent liquid, such as water, and forming an indicating liquid is placed within the container at a level so as to have portions of the liquid located between the ends of the pipes. Thus, if the pressure of the gas as it is transmitted from the pipe connected with the source of supply is greater than the pressure of gas connected with the system, the indicating element located between the ends of the pipes will bubble or otherwise be visibly affected indicating pressure leakage in the system. Also, by mere manipulation of the valve in reversing the cock and shutting down the source of supply, as from a street conduit, the pressure within the system may be balanced against the pressure within the pipe line leading from the source of supply or street conduit, thus indicating to the user of the system the escapement, if there be any, of gas in that portion of the line and indicating the necessity of repair to a condition of increasing cause of fire and damage to the owner of the property on which a gas system is installed. If desired, the liquid may have in solution certain odoriferous or volatile aromatics which will impart to the gas bubbling through the liquid a certain odor which may be recognized in the gas and enables location of the leak.

Particularly as shown in the drawing, the detector is permanently installed in a suitable gas pipe line 1 in which the pipe 2 connects with the source of supply and the pipe 3 is connected to the system. The detector has a valve 4 which is connected intermediate the pipe 2 and the pipe 3 and has a hollow cock 6. The cock may be rotated in the valve by a suitable handle 7. The cock 6 has ports 10 which under normal circumstances of use of the line 1 are located so as to register with the valve inlets 11 to which the pipes 2 and 3 are connected and thereby permits the uninterrupted flow of gas from the pipe 2 through the valve to the pipe 3 and through the system.

In order to direct the gas to a position whereby a test of the pressures of the gas in the system and in the source of supply may be made, the walls of the cock 6 have auxiliary ports 15 and 16 which are adapted to register with the opposite inlets 11 of the pipes 2 and 3 respectively when the cock 6 is rotated through a substantially 90 degree angle from the point of registration of the ports 10 with the inlets 11. The port 15 will be located in registration with the inlet 11 of the pipe 2 and the port 16 will be located in registration with the inlet 11 of the pipe 3. Thus, the pressures of the gas on opposite sides of the cock 6 will be transmitted to chambers 20 and 21 formed within the cock.

The cock 6 is provided with a web or wall 17 which divides the interior of the cock into the chambers 20 and 21. The port 15 connects the chamber 20 with the inlet 11 of the pipe 2 and the port 16 connects the chamber 21 with the inlet of the pipe 3. The gas under pressure from each of the pipes 2 and 3 will be held in separate chambers or compartments to which the indicating liquid may be exposed to detect the presence of a leak in the system connected to the pipe 3.

A testing container 25 for containing the indicating liquid is preferably formed of glass and supported close to the valve by a suitable bracket 26. The bracket 26 may be formed of metal and integrally with the body of the valve 4. The container 25 has a suitably sealed cover plate 24. The cover plate 24 has an opening 27 through which an indicating liquid, such as water 28, may be introduced into the container, and the opening 27 closed by a plug 30. The cover plate 24 has an opening 31 which is adapted to receive a pipe 32. The pipe 32 extends well within the container and below the surface of the water 28 and preferably has a return curved end 33 and a mouth portion 36. The other end of the pipe 32 is connected by a suitable collar 34 to an opening 35 formed in the wall of the valve 4 and with the chamber 20 of the cock through the port 10. The impressed gas within the chamber 20 will tend to expand and transmit its pressure through the port 10 to the pipe 32 and through the mouth 36 to under the surface of the water 28. Consequently, if the pressure above the surface of the water be less than the pressure exerted by the gas as it is transmitted to below the surface, the gas will move and bubble through the water from the mouth 36 of the pipe 32.

The surface of the water 28 is exposed to the pressure of the gas in the chamber 21 by a pipe 40 which connects an opening 41 in the cover plate 24 with an opening 42 in the wall of the valve 4. The opening 42 communicates with the chamber 21 through the port 10. Thus, if there be a leak or escape of gas from the line 3, the pressure of the gas in the system or pipe 3 will be less than the pressure of the gas in the source of supply or pipe 2 and the pressure of the gas upon the surface of the water 28 will be of a less magnitude than the pressure of the gas below the surface of the water and the water located between the ends of the pipes will bubble or boil, indicating thereby the existent condition of leakage or escape. If desired, the water 28 may have in solution an odoriferous element, such as peppermint, which will aromatize the gas as it bubbles through the water and thus enable one to locate with a substantial degree of certainty the exact position of a leak.

The pipe 2 from the source of supply of gas may be tested by rotating the valve in a direction opposite to that previously described above so that the port 15 communicates with the pipe 3 and the port 19 with the pipe 2. The existence of a pressure differential of the gas in the pipe 2 and in the pipe 3 will be readily and visibly indicated in the testing container 25, assuming, of course, that the pipe 2 has been closed as against the further pumping action from the source of supply for the purposes of conducting the test.

By experimentation and study, the size and rapidity with which the bubbles are formed will indicate to an observer the probable size of a leak as well as the presence of a leak. The cock 6 may be rotated after a testing operation to locate the ports 10 in alignment with the inlets 11, permitting thereby the normal flow of gas through the system.

Thus, I have provided a device which by mere rotation of a valve member will indicate in a visible testing container the presence or absence of a leak in the system or pipes leading from the source of supply.

I claim:

1. Means for detecting leaks in gas systems having a main line, including a detector having a chamber enclosing the free ends of gas by-pass conduits connected to the main line, and a single valve having a port for registry with the main line and also having a pair of passages therein communicating with the main line on opposite sides of said valve and each passage also communicating with one of the by-pass conduits whereby the valve when in one position permits uninterrupted flow through the main line and when in another position causes gas to flow through said detector.

2. Means for detecting leaks in gas systems having a main line, including a detector having a chamber enclosing the free ends of gas by-pass conduits connected to the main line, and a single valve having a port for registry with the main line and also having a pair of independent chambers each provided with a port communicating with the main line on opposite sides of said valve, and each port also communicating with one of the by-pass conduits whereby the valve when in one position permits uninterrupted flow through the main line and when in another position causes gas to flow through said detector.

3. Means for detecting leaks in gas systems having a main line, including a leak detector for securement to said main line, a by-pass for connection to said main line and connected to the detector, a second by-pass for connection to the main line and said detector, a single valve for location in the main line adjacent said by-passes, said valve being hollow and having an opening therethrough whereby to permit uninterrupted flow of gas through the main line when the same is in one position, and being provided with a web extending across the opening and which divides the valve interior into a pair of independent chambers and further having passages for simultaneously by-passing all of said gas through said detector when the valve is in a second position, whereby to detect any leaks occurring in the main line beyond the outlet side of said valve.

FREDERICK G. GRISS.